United States Patent [19]

Siligoni et al.

[11] Patent Number: 4,756,022
[45] Date of Patent: Jul. 5, 1988

[54] INTEGRATED CIRCUIT FOR THE TRANSMISSION OF TELEPHONE SIGNALS

[75] Inventors: Marco Siligoni; Pietro Consiglio, both of Milan, Italy

[73] Assignee: SGS Microelettronica SpA, Milan, Italy

[21] Appl. No.: 790,971

[22] Filed: Oct. 24, 1985

[30] Foreign Application Priority Data

Oct. 31, 1984 [IT] Italy .................... 23419 A/84

[51] Int. Cl.$^4$ ............................................ H04M 1/60
[52] U.S. Cl. ....................................... 379/395; 379/387
[58] Field of Search ............... 307/359, 547, 549, 555, 307/567; 179/170 NC, 81 B, 81 A, 81 R, 170 R; 379/405, 387, 392, 388, 389, 390, 391, 395, 403

[56] References Cited

U.S. PATENT DOCUMENTS

| | | | |
|---|---|---|---|
| 3,177,295 | 4/1965 | Lane et al. | 379/387 |
| 3,238,382 | 3/1966 | Ott | 307/555 X |
| 3,566,285 | 2/1971 | Schroeder | 379/390 |
| 3,707,606 | 12/1972 | Crespel et al. | 379/391 X |
| 3,711,660 | 1/1973 | Cherry | 379/403 |
| 4,031,331 | 6/1977 | Sencer | 379/395 |
| 4,071,713 | 1/1978 | Sencer | 379/391 |
| 4,227,095 | 10/1980 | Bazil | 307/229 |
| 4,476,350 | 10/1984 | Aull et al. | 379/382 |
| 4,506,113 | 3/1985 | Blomely | 381/107 |
| 4,577,064 | 3/1986 | Haft et al. | 379/324 |
| 4,608,462 | 8/1986 | Blomely et al. | 379/389 X |
| 4,644,579 | 2/1987 | Whittaker | 379/388 |

Primary Examiner—Jin F. Ng
Assistant Examiner—R. Vaas
Attorney, Agent, or Firm—Wenderoth, Lind & Ponack

[57] ABSTRACT

An integrated circuit for the transmission of telephone signals is designed so as to be inserted in a speech circuit of a subscriber's telephone set and includes a threshold comparator having first and second input terminals coupled to the terminals of a two-wire telephone line and an output terminal connected to a point of the signal path of the circuit. The threshold of this comparator is set such that when the voltage at the terminals of the line drops to a predetermined value, which is not lower than the minimum voltage value required to ensure the correct operation of all the components of the circuit, it generates an output signal used to limit the amplitude of the negative peaks of the waveforms of the transmitted signals.

11 Claims, 2 Drawing Sheets

INTEGRATED CIRCUIT FOR THE TRANSMISSION OF TELEPHONE SIGNALS

BACKGROUND OF THE INVENTION

The present invention relates to circuits for the transmission of telephone signals, in particular monolithically integrated transmission circuits designed to be inserted in the speech circuits of subscribers' telephone sets.

A subscriber's telephone set is, in general, connected to the telephone exchange by a two-wire line to whose terminals the speech circuit, which is designed to receive and transmit the telephone signals via the line, is connected in parallel with other telephone components.

The speech circuit is supplied by the line in which there flows a direct current on which an alternating signal component is superimposed.

The various stages of the speech circuit are designed such that the current absorption from the line for their power supply is constant so as not to interfere with the signals themselves.

A telephone speech circuit is essentially a signal transducer which enables the connection of both the microphone transmitter and the receiver of the subscriber's telephone set to the subscriber's telephone line.

In general, the speech circuit of a subscriber's telephone set is constructed using a structure having a Wheatstone bridge configuration.

One "diagonal" of the bridge forms the reception channel of the circuit and the other the transmission channel.

The terminals of the subscribers' telephone line are connected to two nodes of the bridge which do not belong to the same diagonal.

Accurate balancing of the entire bridge structure is essential in order to minimize the "local effect", i.e. the effect in which the person speaking hears his or her own voice through the receiver of the telephone set.

However, in speech circuits which are partly or totally integrated, completely accurate balancing may not be sufficient to provide control over the local effect for correct operation, the stages of a monolithically integrated telephone circuit require a minimum supply voltage whose value is determined by the design layout and the particular integration technology used.

The maximum voltage which may be used for the supply of the stages of a telephone speech circuit is the voltage at the terminals of the line to which the circuit is connected which is equal to the voltage of constant value of the line present at these terminals in the absence of a signal plus a variable voltage component due to the possible signal being received and transmitted and superimposed on this voltage of constant value.

Since the signals being received are attenuated by the line when they reach its terminals, it is essentially the signals being transmitted, amplified by the speech circuit, which cause positive or negative variations of the voltage present at the line terminals.

When the direct voltage at the terminals of the line is reduced as a result of the length of the line, the instantaneous voltage at the line terminals may be, for one or more stages of the speech circuit, lower than the minimum voltage required for the correct operation of these stages, in the area of the negative peaks of the waveform of the signal being transmitted.

This has a detrimental effect on the correct operation of the entire speech circuit, particularly if it is monolithically integrated, with considerable interference in both transmission and reception.

The overall balance of the circuit is obviously lost with the result that control over the "local effect" is compromised.

The possible occurrence of these drawbacks in subscribers' line of considerable length has, to a large extent up to now, prevented the general introduction of monolithically integrated speech circuits in subscriber's telephone sets.

SUMMARY OF THE INVENTION

The object of the present invention is to provide an integrated circuit for the transmission of telephone signals, supplied by the same two-wire line via which the signals are transmitted, in which possible effects which are detrimental to the correct operation of the circuit, due, in low voltage line conditions, to the negative peaks of the waveforms of the signals transmitted, are avoided.

In addition, it is desired for this transmission circuit, designed to be inserted in the speech circuits of subscribers' telephone sets, also to prevent these possible drawbacks in the speech circuit in which it is possibly inserted.

This object is achieved by the telephone signal transmission circuit set out and characterized in the present claims.

The object may be achieved by providing:

a signal transducer circuit for the transmission of signals is between a signal generator and a two-wire transmission line, having at least a first input terminal coupled to said signal generator and at least first and second output terminals coupled to first and second line terminals, said circuit comprising threshold comparator having first and second input terminals respectively coupled to said first and second line terminal, and an output terminal coupled to a point along a path of said signals within said circuit itself, a threshold of said comparator being selected such that when a voltage between said first and second terminals of said line drops to a predetermined value which is not lower than a predetermined minimum voltage value required to ensure a correct operation of said circuit, said comparator generates an output signal which causes said circuit to limit the amplitude of negative peaks of waveforms of said transmitted signals.

BRIEF DESCRIPTION OF THE DRAWINGS

The invention is described in detail below, purely by way of non-limiting example, with reference to the attached drawings, in which.

The same reference numerals and letters are used in FIGS. 1–3 for corresponding components.

DESCRIPTION OF THE PREFERRED EMBODIMENT

Figure 1:
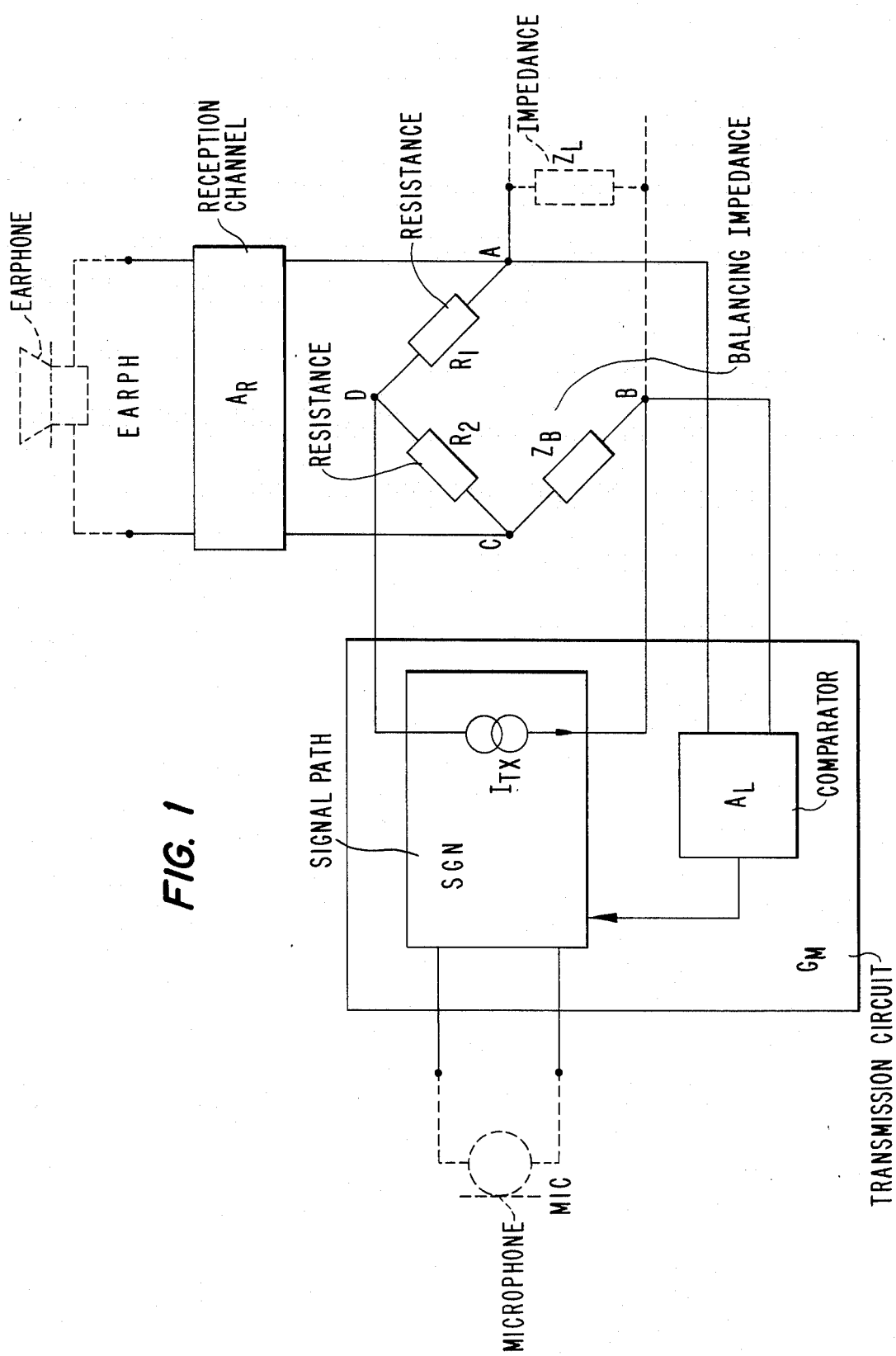
FIG. 1 is a block diagram of a telephone speech circuit with a Wheatstone bridge structure, comprising a transmission circuit of the present invention.

The circuit for the reception and transmission of telephone signals shown in FIG. 1 comprises circuit components connected in a Wheatstone bridge configuration whose nodes are shown by the letters A, B, C and D.

The nodes A and B are the output terminals of the circuit to which there are connected, possibly via a polarity control circuit (not shown), the terminals of a two-wire telephone line shown in FIG. 1, together with its impedance $Z_L$ seen from the subscriber's telephone set, by dashed lines, as are all the other components not included in the circuit itself.

The nodes A and C are bridge reception nodes to which there is coupled, via a reception channel $A_R$ comprising a signal amplifier, an electro-acoustic transducer for listening EARPH contained in the subscriber's telephone set and not shown in further detail in the FIG. 1.

The nodes B and D are the bridge transmission nodes to which there is connected a microphone MIC of the telephone set by means of a transmission channel formed by a transmission circuit $G_M$ constructed in accordance with the present invention.

This transmission circuit comprises a current generator output stage $I_{TX}$, driven by the signals generated by the microphone of the set MIC and forming part of a signal path within the transmission circuit shown by a block SGN in the Figure.

The transmission circuit $G_M$ comprises, in accordance with the present invention, a threshold comparator $A_L$ having a first and a second input terminal connected to the nodes A and B respectively, and an output terminal connected to a point of the signal path SGN.

The threshold of this comparator $A_L$ is regulated such that when the voltage between the nodes A and B, or between the terminals of the two-wire line connected thereto, by means of which the circuit is also supplied, drops to a predetermined value, as a result of the negative peaks of the waveform of the signal being transmitted, the comparator generates a signal designed to limit the amplitude of these peaks.

This predetermined value is selected such that it is not lower than the highest value from among the minimum voltages required for the correct operation of each of the individual stages which not only form the transmission circuit $G_M$, but the entire speech circuit.

This ensures that each stage of the speech circuit receives the necessary supply voltage, provided, obviously, that the direct voltage at the terminals of the line itself is sufficient. Consequently when the entire structure is balanced, full control over the local effect is provided.

A balancing impedance $Z_B$ is consequently inserted between the nodes B and C.

The bridge circuit structure shown in FIG. 1 further comprises a first and second resistance $R_1$ and $R_2$ inserted between the nodes A and D and the nodes C and D respectively.

The point of the path of the signal being transmitted selected for connection to the output terminal of the threshold comparator $A_L$ may in theory be any point of this path, although in the practical embodiment of the circuit some points are particularly advantageous as they avoid, as will be explained below, the need for particular values of the circuit components.

It should also be noted that even though a transmission circuit of the present invention is normally inserted in a speech circuit of the type which may be monolithically integrated as shown, for example, in FIG. 1, it may in some cases be connected individually to the telephone line, or may even be inserted as an integrated component in a speech circuit which may not be completely electronic and which does not necessarily have a Wheatstone bridge structure.

In these cases, the threshold of the comparator, whose input terminals are then connected directly to the output terminals of the transmission circuit, is obviously selected so as to guarantee correct operation of the stages of the transmission circuit.

Figure 2:
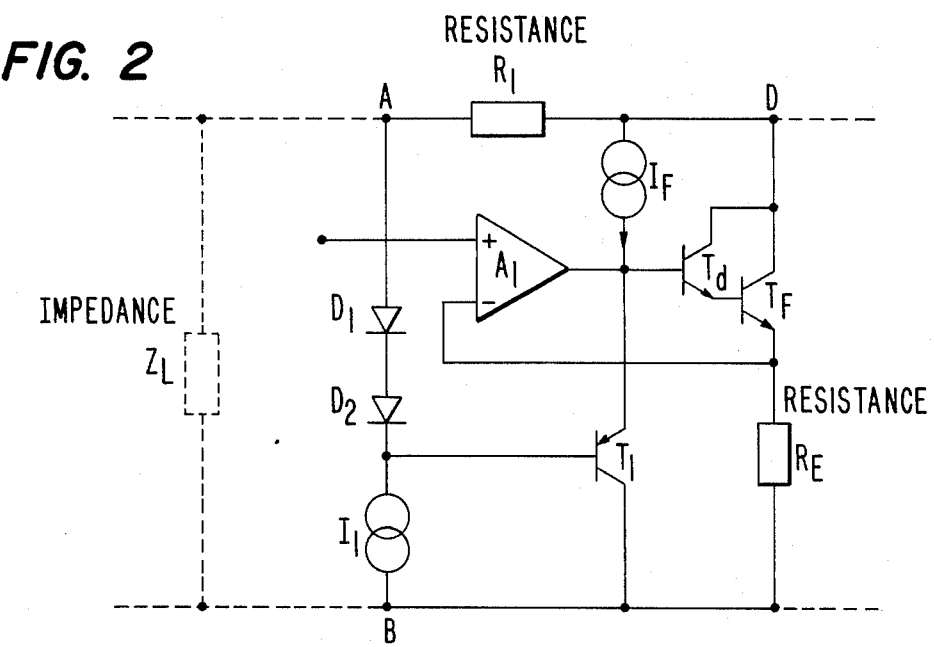
FIG. 2 shows the possible embodiment of the output stage of a transmission circuit of the present invention, in which the amplitude of the negative peaks of the waveforms of the signals transmitted is directly limited.

FIG. 2 shows the circuit diagram of a particularly advantageous embodiment of the output stage, shown by $I_{TX}$ in FIG. 1, of a transmission circuit of the present invention, the output terminal of the threshold comparator $A_L$, included in the transmission circuit, being directly connected to a point thereof, so as to limit the amplitude of the negative peaks of the signal being transmitted in a particularly advantageous way.

This embodiment may be used in a speech circuit of the type shown in FIG. 1.

The output stage shown in FIG. 2 comprises a bipolar NPN control transistor $T_d$ and a bipolar NPN output transistor $T_F$, connected in a Darlington configuration.

The terminals of the collector and emitter of the output transistor $T_F$ are respectively connected via a node D and a first resistance $R_1$ to a first terminal (node A) of a two-wire telephone line of impedance $Z_L$, and to a second terminal (node B) of the line via a second resistance $R_E$.

The output stage also comprises an operational amplifier A1 having a non-inverting input terminal "+" which forms the signal input of the stage, and having an inverting input terminal "−" which is connected to the emitter terminal of the output transistor $T_F$, and having an output terminal which is connected to the base terminal of the control transistor $T_d$. This base terminal of the transistor $T_d$ is also connected, via a constant current generator $I_F$, to the node D between the resistance $R_1$ and the collector terminal of the transistor $T_F$. The resistance $R_1$ is not, however, absolutely necessary.

The threshold comparator connected to the output stage comprises a bipolar PNP transistor T1 having its collector terminal and its emitter terminal respectively connected to the node B and to the base terminal of the control transistor $T_d$.

The base terminal of this transistor T1 is connected both to the node A, via first and second diodes $D_1$ and $D_2$ connected in series, and to the node B via a constant current generator $I_1$.

In the output stage of FIG. 2, the operational amplifier A1 with the feedback between the emitter terminal of the output transistor $T_F$ and the inverting input of the amplifier itself, enables the current flowing through the Darlington configuration to be stabilized in the absence of an input signal.

If the signal being transmitted is at a normal level, the voltage at the line terminals, connected to the nodes A and B in the circuit, remains high enough, in the case of line lengths having suitable standard parameters, to keep the transistors T1 inoperative.

The base potential of this transistor is in fact equal to the potential of the node A less twice the junction voltage of a diode, and its emitter potential is equal to the base potential of the transistor $T_d$, or equal to the potential of the node B plus twice the base-emitter voltage of a transistor in conduction plus the voltage drop at the resistance $R_E$, since the base-emitter junction of the PNP transistor T1 is reverse biased, if, of course, the voltage at the line terminals and therefore between the nodes A and B is sufficiently high.

However, when the amplitude of the negative peaks of the waveform of the signal being transmitted, which is added to the continuous line voltage, is such as to lower the value of the voltage between the nodes A and B of the line terminals to the value equal to three times the voltage of a forwardly biased bipolar junction plus the voltage drop at the resistance $R_E$, then the base-emitter junction of the transistor T1 is forwardly biased and this transistor begins to conduct, absorbing current from the generator $I_F$ and therefore limiting the conduction of the final transistor $T_F$. The amplitude of the negative peaks of the waveform of the signal transmitted is therefore limited until a return of the normal transmission conditions does not lead to the transistor T1 being cut off.

The minimum resultant voltage at the line terminal is set so as to be sufficient for a correct voltage supply of all the stages of the transmission circuit, or of all the stages of the speech circuit in which this transmission circuit may be inserted, when they are designed and monolithically integrated in accordance with current techniques known to persons skilled in the art.

Figure 3:
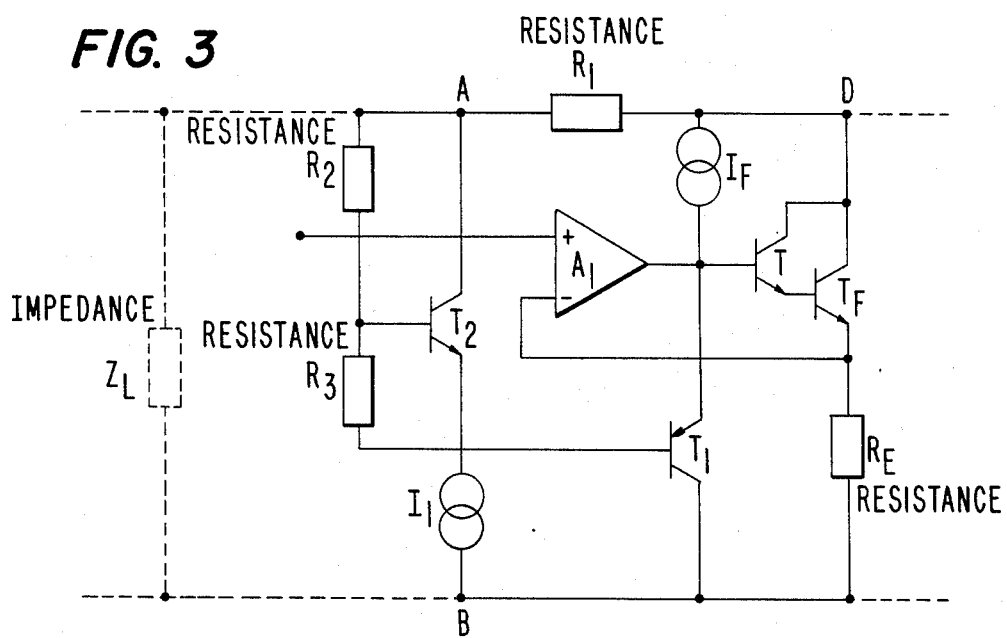
FIG. 3 shows a modification of the embodiment illustrated in FIG. 2.

Moreover, using the diodes $D_1$ and $D_2$, the resultant threshold for the amplitude limitation is certainly insufficient to cause undesired limitations of the level of the signal being transmitted. As shown in FIG. 3, the diodes $D_1$ and $D_2$ may, however, be replaced by a resistance of predetermined value or even, for the purposes of achieving optimum regulation of the threshold, by a transistor T2 having its collector and emitter terminals inserted between the node A and the base terminal of the transistor T1 and base biased by means of a voltage divider consisting of resistors $R_2$ and $R_3$, also inserted between the node A and the base terminal of T1.

The combination of the output stage and the threshold comparator connected thereto, as embodied in accordance with FIG. 2, is particularly advantageous both in terms of design simplicity and accurate operation.

The only specific parameter required for the threshold comparator is that relating to the transistor T1 which must be able to absorb all of the current flowing from the direct current generator $I_F$ when the regulation conditions so require.

Although a single embodiment of the invention has been described and illustrated, it is obvious that many variants are possible without departing from the scope of the invention. For example, the limitation of the negative peaks of the waveforms of the signal transmitted may be carried out in a non-abrupt manner by rounding off the clipped peak by means of a suitable compression obtained by means of a variable gain threshold comparator or other circuit means known to persons skilled in the art.

It is also possible to limit the amplitude of the positive peaks of the waveform of the signal transmitted in a symmetrical manner, so as to prevent at least part of the harmonics inevitably generated by non-symmetrical clipping of the signal peaks.

We claim:

1. A signal transducer circuit for the transmission of signals, which is disposed between a signal generator and a two-wire transmission line, has at least a first input terminal coupled to said signal generator and at least first and second output terminals respectively coupled to first and second line terminals, said circuit comprising a threshold comparator having first and second input terminals respectively coupled to said first and second line terminals, and an output terminal coupled to a point between said signal generator and said two-wire transmission line, a threshold of said comparator being selected such that when a voltage between said first and second terminals of said line drops to a predetermined value which is not lower than a predetermined minimum voltage value required to ensure a correct operation of said circuit, said comparator generates an output signal which causes said circuit to limit the amplitude of negative peaks of waveforms of signals transmitted by the transducer circuit.

2. A circuit as claimed in claim 1, wherein said circuit includes means for receiving power via said two-wire transmission line.

3. A signal transducer circuit for the transmission of signals, which is disposed between a signal generator and a two-wire transmission line, has at least a first input terminal coupled to said signal generator and at least first and second output terminals respectively coupled to first and second line terminals, said circuit comprising a threshold comparator having first and second input terminals respectively coupled to said first and second line terminals, and an output terminal coupled to a point between said signal generator and said two-wire transmission line, a threshold of said comparator being selected such that when a voltage between said first and second terminals of said line drops to a predetermined value which is not lower than a predetermined minimum voltage value required to ensure a correct operation of said circuit, said comparator generates an output signal which causes said circuit to limit the amplitude of negative peaks of waveforms of signals transmitted by the transducer circuit; further comprising an output stage comprising a Darlington transistor pair device having a collector terminal and an emitter terminal respectively connected between said first and second output terminals of said circuit, and having a base terminal which is coupled, via a direct current generator, to said first output terminal of said circuit and is also connected to an output terminal of an operational amplifier also included in said output stage of said circuit and having a non-inverting input terminal which forms a signal input of said output stage and an inverting input terminal which is connected to said emitter terminal of said Darlington device, and wherein said threshold comparator further comprises a first transistor having an emitter terminal connected to said base terminal of said Darlington device and having a collector terminal connected to said second output terminal of said circuit and having a base terminal coupled to both said first output terminal of said circuit, via a circuit means for establishing a predetermined potential difference, and to said second output terminal of said device, via a direct current generator.

4. A circuit as claimed in claim 3, wherein said circuit means for establishing a potential difference comprises at least first and second diodes connected in series.

5. A circuit as claimed in claim 3, wherein said circuit means for establishing a potential difference comprises a resistance.

6. A circuit as claimed in claim 3, wherein said circuit means for establishing a potential difference comprises a second transistor having emitter and collector terminals inserted between said first output terminal of said circuit and said base terminal of said first transistor of said threshold comparator, and wherein a voltage divider is also inserted between said first output terminal of said circuit and said base terminal of said first transistor of said threshold comparator, a base terminal of said second transistor being connected to said divider so as to bias said second transistor.

7. A circuit as claimed in claim 3, wherein said circuit includes means for receiving power via said two-wire transmission line.

8. A circuit for the reception and transmission of telephone signals, which is inserted as a speech circuit in a subscriber's telephone set, has a first branch defined by two nodes from which reception is obtained and a second branch defined by two nodes from which transmission is obtained, a first node of said first branch and a first node of said second branch being output terminals for coupling to terminals of a two-wire telephone line, said circuit including a signal transducer circuit comprising: at least a first input terminal coupled to a signal generator and at least first and second output terminals respectively coupled to first and second line terminals, said signal transducer circuit comprising a threshold comparator having first and second input terminals respectively coupled to said first and second line terminals, and an output terminal coupled to a point between said signal generator and said two-wire telephone line, a threshold of said comparator being selected such that when a voltage between said first and second terminals of said line drops to a predetermined value which is not lower than a predetermined minimum voltage value required to ensure a correct operation of said circuit, said comparator generates an output signal which causes said circuit to limit the amplitude of negative peaks of waveforms of the signals transmitted by the transducer circuit; said signal transducer circuit being inserted by means of its first and second output terminals between said two nodes from which transmission is obtained, and said first and second input terminals of said threshold comparator being connected to said first node of said first branch and said first node of said second branch respectively.

9. A circuit as claimed in claim 8, wherein said circuit includes means for receiving power via said two-wire telephone line.

10. A circuit for the reception and transmission of telephone signals, which is inserted as a speech circuit in a subscriber's telephone set, having at least a first input terminal coupled to a signal generator and having at least first and second output terminals respectively coupled to first and second terminals of a two-wire telephone line, said circuit including a signal transducer circuit comprising: at least a first input terminal coupled to said signal generator and at least first and second output terminals respectively coupled to said first and second line terminals, said signal transducer circuit comprising a threshold comparator having first and second input terminals respectively coupled to said first and second line terminals, and an output terminal coupled to a point between said signal generator and said two-wire telephone line, a threshold of said comparator being selected such that when a voltage between said first and second terminals of said line drops to a predetermined value which is not lower than a predetermined minimum voltage value required to ensure a correct operation of said circuit, said comparator generates an output signal which causes said circuit to limit the amplitude of negative peaks of waveforms of signals transmitted by the transducer circuit.

11. A circuit as claimed in claim 10, wherein said circuit includes means for receiving power via said two-wire telephone line.

* * * * *